US010322513B2

(12) United States Patent
Todorov et al.

(10) Patent No.: US 10,322,513 B2
(45) Date of Patent: Jun. 18, 2019

(54) ROBOT END EFFECTOR APPLYING TENSILE HOLDING FORCE

(71) Applicant: Genmark Automation, Inc., Fremont, CA (US)

(72) Inventors: Alexander Todorov, Santa Clara, CA (US); Zlatko Manolov Sotirov, Santa Clara, CA (US)

(73) Assignee: GENMARK AUTOMATION, INC., Fremont, CA (US)

( * ) Notice: Subject to any disclaimer, the term of this patent is extended or adjusted under 35 U.S.C. 154(b) by 422 days.

(21) Appl. No.: 14/962,647

(22) Filed: Dec. 8, 2015

(65) Prior Publication Data

US 2017/0157779 A1    Jun. 8, 2017

(51) Int. Cl.
*B25J 15/00* (2006.01)
*B25J 11/00* (2006.01)
*B25J 15/02* (2006.01)

(52) U.S. Cl.
CPC ....... *B25J 15/0071* (2013.01); *B25J 11/0095* (2013.01); *B25J 15/0014* (2013.01); *B25J 15/0253* (2013.01)

(58) Field of Classification Search
CPC .............. B25J 15/0071; B25J 15/0253; B25J 11/0095; B25J 15/0014; B66C 1/66
See application file for complete search history.

(56) References Cited

U.S. PATENT DOCUMENTS

| 6,176,668 | B1 | 1/2001 | Kurita et al. |
| 7,153,088 | B2 | 12/2006 | Reimer et al. |
| 7,694,688 | B2 * | 4/2010 | Lester ............... H01L 21/67051 134/140 |
| 2003/0005666 | A1 | 1/2003 | Grams |
| 2007/0262599 | A1 * | 11/2007 | Malmgren ............... B66C 1/66 294/81.51 |
| 2011/0163065 | A1 | 7/2011 | Verhaverbeke et al. |
| 2014/0265394 | A1 | 9/2014 | Pergande et al. |
| 2015/0086321 | A1 * | 3/2015 | Korkiamaki ............... B66C 1/10 414/800 |

OTHER PUBLICATIONS

International Search Report dated Feb. 17, 2017 of PCT Patent Application No. PCT/US2016/000119.

* cited by examiner

*Primary Examiner* — Michael S Lowe
(74) *Attorney, Agent, or Firm* — Nixon Peabody LLP; Jeffrey L. Costellia

(57) ABSTRACT

In one embodiment, a substrate handling robot includes a robot body, a robot arm mounted to the robot body, and an end effector mounted to the robot arm. The end effector includes first and second fingers each having one or more pins protruding therefrom, and a first motor for axially rotating the first finger. At least one pin of the first finger and one pin of the second finger are configured to mate with corresponding holes in the substrate. Rotation of the first finger imparts a tensional force to the substrate, suitable for reducing sag in ultra-thin substrates on the order of 20 to 800 microns. In certain embodiments, both fingers are rotatable, synchronously or independently. In certain embodiments, rotation is replaced by translational or pivoting planar motions, also imparting tensional force to the substrate.

15 Claims, 6 Drawing Sheets

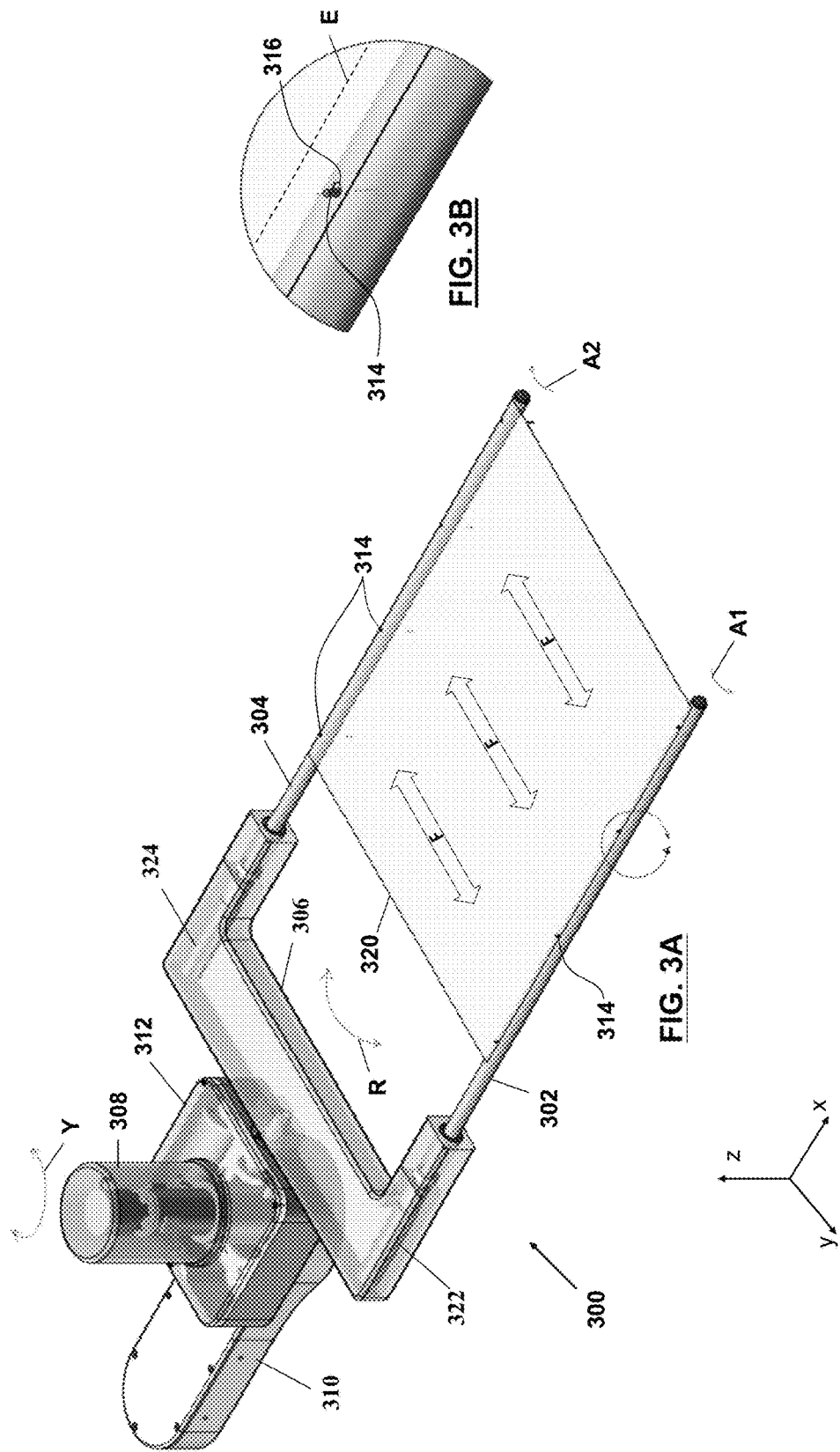

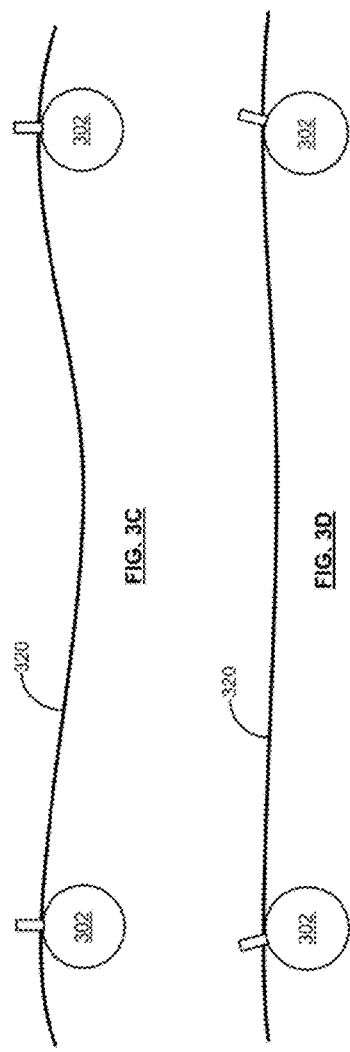

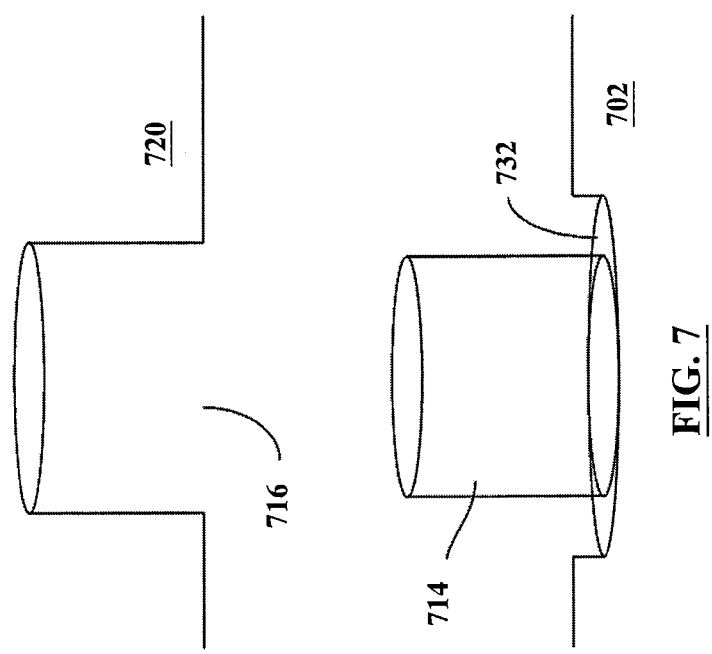

ROBOT END EFFECTOR APPLYING TENSILE HOLDING FORCE

TECHNICAL FIELD

The present disclosure relates generally to robots for handling work pieces such as semiconductor wafers and panels.

BACKGROUND

Robots are commonly used in industrial processing environments. In semiconductor processing, robots transport substrates such as wafers or PCB (printed circuit board) panels to and from storage locations and/or various processing stations. The highly repetitive nature of the motions involved and the speeds required for high throughput make robots ideal candidates for these tasks. FIG. 1 is a plan view of a conventional processing environment 100, in which a semiconductor wafer 108 is transported between various processing stations 110 by a robot 200. In certain embodiments, the robot is also capable of translational motion, along the direction X as shown, typically through use of a track system (not shown). Additional transport destinations, such as 112 and 114, may be for measurement or storage of the wafers 108. The environment 100 may be a closed, controlled vacuum environment, delineated by the perimeter dashed line.

Robot 200 includes a robot body 201 and a robot arm 202, and is shown in more detail in FIG. 2. Robot arm 202 exhibits angular (θ), radial (R) and Z motions in a cylindrical coordinate system. Angular motion refers to rotation of the robot arm 202 about a primary axis A at which it is pivotably coupled to the robot body 201. Radial motion is extension/retraction motion of the robot arm 202 to and from the primary axis A. Z motion is elevation of the robot arm 202 and/or body along the axis A. The motions are imparted by one or more independent or linked motors (not shown).

Robot arm 202 includes three links, although a different number of links is possible. These links 204, 206 and 208 may be dependently or independently actuatable to achieve the angular, radial and Z motions. The distalmost link 208, commonly referred to as the end effector, is tasked with engaging the workpiece for its transport and manipulation between, and sometimes within, the various stations 110, 112, and 114 mentioned above. The end effector 208 is pivotably mounted at its proximal end to the distal end of preceding link 206 for motion about axis B, referred to as yaw motion. This yaw motion of the end effector 208 is independent of the other links and their motions.

The manner in which the end effector interacts with the work piece is of crucial importance. Gripping forces, whether mechanical or vacuum, must be carefully controlled to avoid undue stress or mechanical insult, minimize contamination, or otherwise alter the characteristics of the work piece in any significant manner, while at the same time securely holding the work piece on the end effector. However, the pressures of increased miniaturization make these goals more difficult to achieve, as work pieces become smaller and thinner, and consequently, much more fragile and difficult to handle.

OVERVIEW

Described herein is an end effector for gripping a substrate includes first and second fingers each having one or more pins protruding therefrom, and a first motor for axially rotating the first finger. At least one pin of the first finger and one pin of the second finger are configured to mate with corresponding holes in the substrate. Rotation of the first finger imparts a tensional force to the substrate.

Also described herein is a method for supporting a panel using an end effector having first and second fingers each including one or more pins. The method includes inserting at least one pin of the first finger into a corresponding hole in the panel, inserting at least one pin of the second finger into a corresponding hole in the panel, and rotating the first finger outward to thereby impart a tensile force to the panel.

Also described herein is a substrate handling robot that includes a robot body, a robot arm mounted to the robot body, and an end effector mounted to the robot arm. The end effector includes first and second fingers each having one or more pins protruding therefrom, and a first motor for axially rotating the first finger. At least one pin of the first finger and one pin of the second finger are configured to mate with corresponding holes in the substrate. Rotation of the first finger imparts a tensional force to the substrate.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3A is a perspective view of an end effector of a work piece handling robot in accordance with certain embodiments; and FIG. 3B is a close-up view showing the demarcation of the exclusion zone of the panel;

FIGS. 3C and 3D are schematic illustrations of an engaged panel 320 before (FIG. 3C) and after (FIG. 3D) application of the tensile force F, with the commensurate reduction in sag appearing in FIG. 3D;

FIG. 7 is schematic view of a sensor arranged concentrically with a pin of a finger of the end effector.

DESCRIPTION OF EXAMPLE EMBODIMENTS

Figure 1:
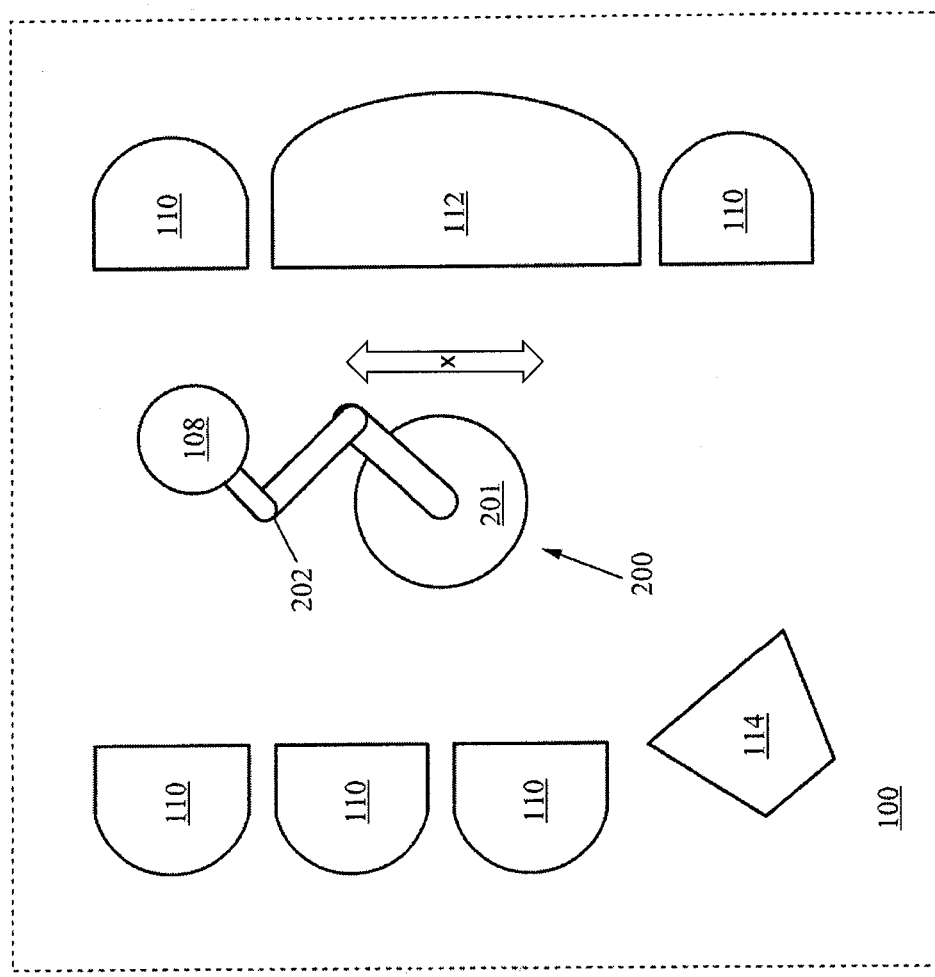
FIG. 1 is a plan view of a conventional processing environment in which a semiconductor wafer is transported between various processing stations by a robot.

Example embodiments are described herein in the context of a panel handling robot. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 3 is a perspective view of an end effector 300 of a work piece handling robot (not shown) in accordance with certain embodiments. The work piece may be generally referred to as a substrate and can include semiconductor wafers or panels, particularly panels used for manufacture of printed circuit boards (PCBs). The end effector 300 has generally a yoke shape, with two fingers 302 and 304 extending from a support member 306. A yaw motor is 308 provides the end effector 300 with yaw motion, rotating the end effector in its plane in the direction of double-headed arrow Y. In certain embodiments, this planar rotation comprises rotation of the end effector 300 relative to a preceding robot arm link 310 on which the end effector is pivotably mounted. Further, a roll motor 312 provides the end effector 300 with roll motion, in the direction of double-headed arrow R. Either or both the yaw and roll motions can be dispensed with in certain embodiments.

End effector 300 is depicted in FIG. 3 engaging a work piece, which in this illustrative embodiment is a generally rectangular or square panel 320 from which a PCB is fabricated. The panel 320 is ultra-thin, on the order of 20 to 800 microns, and is consequently highly flexible and susceptible to sagging and warping. In certain embodiments, the panel has a thickness of about 40 microns. The panel may be in any stage in the manufacturing process of the PCB, and may be in transit from one processing station to another, or it may be in the handoff stage into or out of the processing environment or among different robots or handlers. Engagement with end effector 300 is for the fulfillment of any of these purposes, or others not specifically recited herein.

The manner of engagement of end effector 300 with panel 320 is by way of pins provided on fingers 302 and 304. As seen in detail in cut-out figures FIGS. 3A and 3B, the pins 314 mate with corresponding holes or indentations 316 provided in the panel 320, and may or may not penetrate through the panel, depending on the particular application, thickness of the panels, and other factors. In certain embodiments, the pins 314 and corresponding holes 316 have circular cross-sections. However, this is not by way of limitation as other cross-sectional shapes, such as rectangular, square, oval, etc., are contemplated. More generally, any protrusions may be considered "pins" for purposes of this disclosure, and may have form factors and profiles that are different from the generally cylindrical or columnar shapes described herein. The corresponding holes of the substrate would of course be shaped in conformance.

Returning to FIG. 3, one or both fingers 302 and 304 are configured to rotate axially, in the direction of arrows A1 and A2, to thereby exert a tensile force in the plane of the panel 320, outward toward the engaged edges of the panel, as illustrated by arrows F. The planar tensile force F exerted by rotation of fingers 302, 304 is important because of the flexible nature of the panel. The tensile force F reduces sag or deformation of the panel and retains the panel 320 securely in position on end effector 300 without relative motion between these two components as the panel is transported or manipulated by the end effector. Thus the rotational motion of the fingers 302 and 304 and exertion of the planar tensile force F pulls the panel 320 taught, flattening its surfaces so that its sag is reduced. The reduced sag commensurately reduces drag of the panel 320 for improved high speed handling and transport, and the flattened surface that is presented better conforms the panel to various processing procedures it may need to undergo. For example, deposition of layers and materials on the panel is not negatively impacted by the manipulation by the end effector. Reducing sag contributes to retaining the integrity of the panel throughout its processing. In addition, reduced sag allows insertion of the panel in narrower areas and compliance with stronger mechanical constraints imposed by processing machines and substrate carriers. Importantly, engaging the panel 320 exclusively at its edges, without additional internal support, complies with industry requirements that contact with the panel occur only at the "exclusion zone" of the panel, which in some embodiments extends only 3 mm inward, along the length of the edges. Dashed line E in FIGS. 3A and 3B delimits this exclusion zone. FIGS. 3B and 3C are schematic illustrations of an engaged panel 320 before (FIG. 3B) and after (FIG. 3C) application of the tensile force F, with the commensurate reduction in sag appearing in FIG. 3C.

Figure 4:
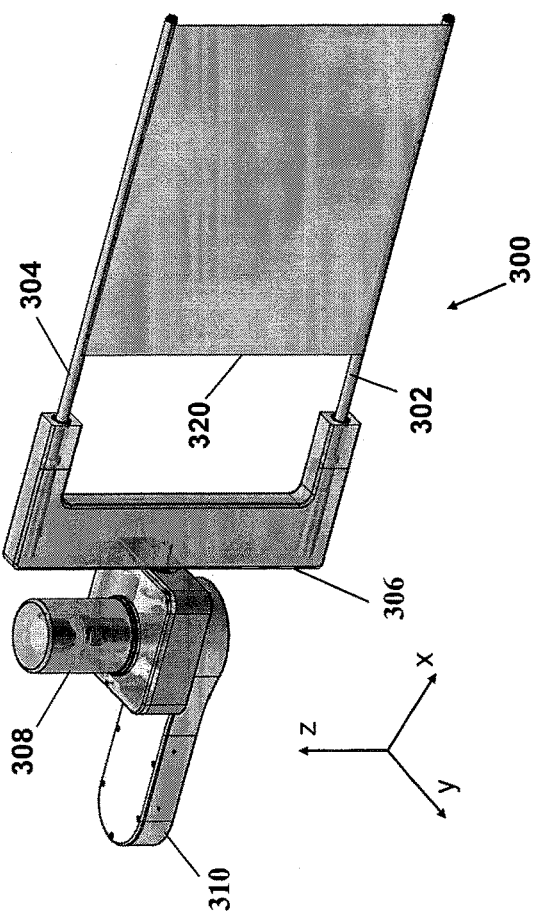
FIG. 4 is an isometric view demonstration a roll motion of the end effector and panel to achieve a vertical orientation.
Figure 2:
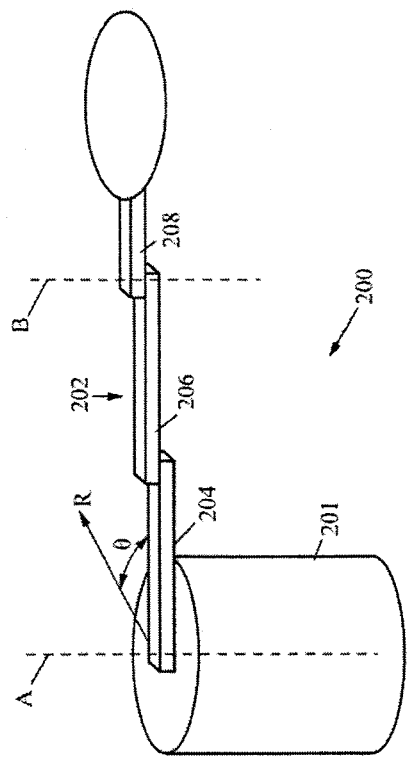
FIG. 2 is a more detailed view of the robot of FIG. 1.

The tensile force F, realized through the rolling action of fingers 302 and 304 in certain embodiments, is sufficient to securely retain the panel 320 on end effector 300 in any desired orientation and position, as the robot arm (not shown) and end effector move through free space. These orientations and positions are achieved through any combination of the angular (A), radial (R), Z and X motions mentioned above, in addition to the roll and yaw motions of the end effector 300, and further in addition, in some embodiments, to a pitch motion which the end effector may be configured to perform. Notably, secure retention of the panel 320 on end effector 300 enables rotation of the panel by 90 degrees, for example from a horizontal to a vertical position, which may be necessary for a handoff process of the panel between the end effector and a different component, such as a storage pod or a different robot. Such rotation is accomplished by way of roll motor 312, and is shown in FIG. 4. The handoff can be to or from the end effector 300.

The tensile force F can be achieved by rotating only one of the fingers 302 or 304, while maintaining the other in a stationary state. Alternatively, both fingers 302 and 304 can be rotated axially, in synchronized or unsynchronized, independent motions. Axial rotation of both fingers 302, 304 is motivated by motors 322, 324 disposed in support member 306, or elsewhere in the end effector or robot. In certain embodiments, one of the motors 322, 324 may be dispensed with, and rotation of both fingers 302 and 304 mechanically linked to a single motor.

In the case of sufficiently flexible substrates or work pieces, such as ultra-thin panel 320, the axial rotation of the fingers 302 and 304 operates to slightly roll the panel, in conformance with the curvature of the finger cross-section, which in certain embodiments is circular, although other finger cross-sections are contemplated. The panel 320 is thus retained in place securely by action of any combination of friction, interference and contact. The retention may be referred to herein as gripping or holding. Release of the panel 320 is effected by reversing the direction of rotation of fingers 302 and 304, to neutralize the tensile force. The release may be referred to herein as ungripping. The reversed, release direction of rotation of fingers 302 and 304 may be referred to as inward rotation, considering the panel, and the direction of the force towards its interior, as the frame of reference; while the engagement direction of rotation of fingers 302 and 304, establishing the tensile force F, may be referred to as an outward rotation, considering the panel, and the direction of the force towards its exterior, as the frame of reference.

Figure 5:
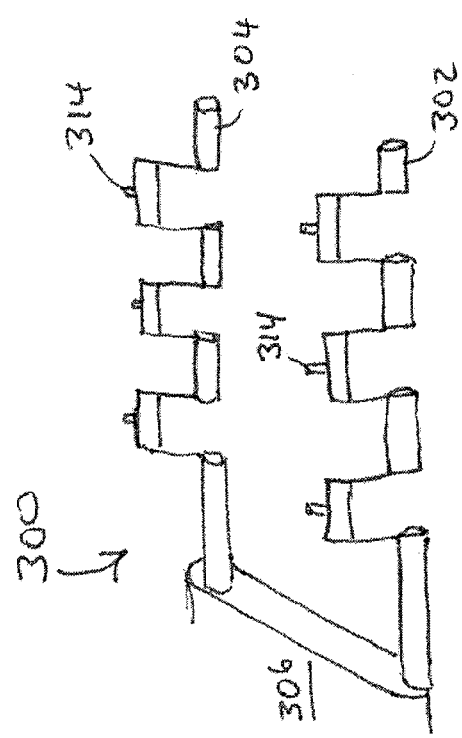
FIG. 5 is schematic view showing crankshaft-shaped fingers.

Typically the panel 320 is square or rectangular in shape, although this is not necessarily the case, as other shapes or even substrates are contemplated. Further, in certain embodiments, it may not be necessary for the fingers 302 and 304 to conform to the shape of the edge of the panel, which in the case of the example PCB panel 320 is a rectangle. Rather, one or both the fingers 302, 304 can have a non-straight shape, such as "crankshaft" shape shown in FIG. 5.

Figure 6:
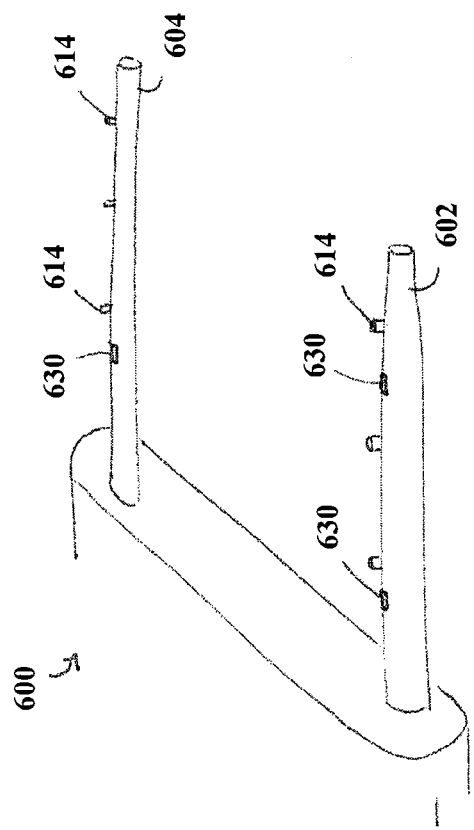
FIG. 6 is a schematic view showing optional sensors mounted on the fingers of the end effector.

In certain embodiments the end effector may be equipped with sensors, for example to detect the presence, orientation or alignment of the substrate on the end effector, and, more specifically, to assist in the process of engaging the substrate or disengaging therefrom. FIG. 6 is directed to such an arrangement, and depicts sensors 630 distributed on the fingers 602, 604 of end effector 600. Other locations on the end effector, including those not on the fingers themselves, are also possible. The sensors 630 may be mechanical or optical (reflection, through-beam, proximity) for example, and generally operate by detecting the edges of the substrate, or detecting specific markings or indicia provided thereon for that or other purposes, or by detecting the holes into which the corresponding pins 614 of the end effector are configured to mate. In the latter arrangement, the sensor location can be substantially coincident with or proximal to the location of the pins, to facilitate detection of the corresponding holes. Generally, the number and location of sensors will depend on many factors, including for example the type of sensor used, the type of motion and processing envisioned, the type of work piece, and so on. In certain embodiments, the end effector may be equipped with sensors that allow unique determination of the position and orientation of the substrate. In certain embodiments, this is accomplished using at least two sensors for detecting the leading edge of the substrate, or two sensors for detecting the trailing edge of the substrate. In addition, at least one sensor is used to detect one of the side edges of the substrate. In addition to the sensors determining the position and the orientation of the substrate, at least one "control" sensor may also be used—that is, a sensor that detects the concentricity of a designated hole with the corresponding pin that engages with this hole. Other control sensors, such as those detecting a dedicated marking or indicia, may be used. Further, more than one control sensor may be used.

FIG. 7 is directed to an arrangement in which a control sensor 732 is disposed concentrically with a pin 714 of a finger 702 of an end effector. The control sensor is operable to detect hole 716 of a substrate 720, for example optically, by sensing a difference in reflection between the hole and the substrate surface.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An end effector for gripping a substrate, comprising:
   a support member configured to rotate about a roll motion;
   a first finger extending from the support member, the first finger including at least one pin protruding therefrom;
   a second finger extending from the support member, the second finger including at least one pin protruding therefrom, wherein the first finger is configured to rotate axially about the support member via a first motor; and
   wherein at least one pin of the first finger and at least one pin of the second finger are configured to mate with corresponding holes in the substrate, and
   wherein rotation of the first finger imparts a planar tensile force on the substrate.

2. The end effector of claim 1, wherein the first motor is mechanically linked to the second finger for axial rotation of the second finger.

3. The end effector of claim 1, further comprising a second motor for axially rotating the second finger.

4. The end effector of claim 3, wherein the first and second motors are independently actuatable.

5. The end effector of claim 3, wherein the first and second motors are synchronized.

6. The end effector of claim 1, wherein the substrate is a panel having a thickness of 20-800 microns.

7. The end effector of claim 6, wherein the substrate is a panel having a thickness of about 40 microns.

8. The end effector of claim 1, further comprising a third motor for providing the end effector with yaw motion rotating the end effector in its plane.

9. The end effector of claim 1, further comprising an additional motor for providing the roll motion of the support member.

10. The end effector of claim 1, further comprising one or more sensors for detecting the substrate on the first finger, and one or more sensors for detecting the substrate on the second finger.

11. A substrate handling robot comprising:
    a robot arm;
    a support arm coupled to the robot arm, the support member configured to rotate about a roll motion with respect to the robot arm; and
    a first finger extending from the support member, the first finger including at least one pin protruding therefrom; and
    a second finger extending from the support member, the second finger including a pin protruding therefrom, wherein the first finger is configured to rotate axially about the supporting member via a first motor,
    wherein at least one pin of the first finger and at least one pin of the second finger are configured to mate with corresponding holes in the substrate, and
    wherein rotation of the first finger imparts a planar tensile force on the substrate.

12. The robot of claim 11, further comprising a second motor for providing the end effector with yaw motion.

13. The robot of claim 11, further comprising a third motor for providing the roll motion of the support member.

14. The robot of claim 11, further comprising one or more motors for imparting one or more of angular (θ), radial (R) and Z motions.

15. The robot of claim 11, said robot being mounted for translational motion along a track system.

* * * * *